(12) United States Patent
Kinoshita et al.

(10) Patent No.: US 7,307,784 B2
(45) Date of Patent: Dec. 11, 2007

(54) HIGH-STABILITY OPTICAL MICROSCOPE

(75) Inventors: Kazuhiko Kinoshita, Aichi (JP);
Megumu Shio, Kanagawa (JP)

(73) Assignee: Japan Science and Technology Agency, Saitama (JP)

( * ) Notice: Subject to any disclaimer, the term of this patent is extended or adjusted under 35 U.S.C. 154(b) by 268 days.

(21) Appl. No.: 10/506,107

(22) PCT Filed: Sep. 3, 2002

(86) PCT No.: PCT/JP02/08935

§ 371 (c)(1),
(2), (4) Date: Aug. 31, 2004

(87) PCT Pub. No.: WO03/079089

PCT Pub. Date: Sep. 25, 2003

(65) Prior Publication Data

US 2005/0117204 A1 Jun. 2, 2005

(30) Foreign Application Priority Data

Mar. 18, 2002 (JP) ............................. 2002-073455

(51) Int. Cl.
*G02B 21/00* (2006.01)
(52) U.S. Cl. ........................ 359/368; 359/382; 359/819
(58) Field of Classification Search ........ 359/368–390, 359/800–820; 355/30–73
See application file for complete search history.

(56) References Cited

U.S. PATENT DOCUMENTS 3,619,035 A * 11/1971 Hopkins .................. 359/679
4,148,552 A * 4/1979 Suzuki et al. ............... 359/388
5,317,153 A * 5/1994 Matsushiro et al. ......... 250/306
5,764,409 A 6/1998 Colvin ........................ 359/382
5,781,277 A * 7/1998 Iwamoto ...................... 355/53
5,970,260 A * 10/1999 Nakayama et al. ........... 396/80
6,208,408 B1 * 3/2001 Takabayashi ................. 355/67
7,085,044 B2 * 8/2006 Richardson .................. 359/368
2001/0028510 A1 10/2001 Ramm et al. ............... 359/663

FOREIGN PATENT DOCUMENTS

JP 08-114750 A 5/1996

* cited by examiner

*Primary Examiner*—Thong Q Nguyen
(74) *Attorney, Agent, or Firm*—Rader, Fishman & Grauer, PLLC

(57) ABSTRACT

This invention provides a highly stable optical microscope that prevents drift and makes it possible to record images or take measurements for several hours with accuracy in the order of nanometers. The highly stable optical microscope of this invention includes the support structure (41) that accommodates and supports components including the optical imaging system, straight tube (28) that accommodates and supports components including the optical photometric system, and support structure (7) that accommodates and supports components including the illumination system. These support structures have a hollow pyramid or conical shape with a low center of gravity. The highly stable optical microscope of this invention features the objective lenses, imaging lenses, optical imaging and photometric systems that are mounted, forming a straight line, on the supporting structures that are symmetrical about the optical axis in both shape and mass.

6 Claims, 3 Drawing Sheets

HIGH-STABILITY OPTICAL MICROSCOPE

TECHNICAL FIELD

This invention relates to image recording and measuring for an extended time using optical equipment, optical measuring instruments or optical microscopes. When an optical microscope, in particular, is used to record images or measurements for an extended time, the microscope is displaced minutely such that the object point (object) is shifted or defocused (so-called drift). This invention provides a structure for a highly stable optical microscope that is suitable for stable image recording or measuring for several hours with an accuracy in the order of nanometers by preventing drift.

BACKGROUND OF THE INVENTION

Conventional optical microscopes may be compared to a willow tree. The sample positioning stage, illumination system, optical observation system and other components mounted on the main stand (corresponding to the trunk of the tree) lack balance and are asymmetrical about the optical axis in both mass and shape. Such an unstable structure is shown in FIG. 1. In FIG. 1, 101 is a television camera, 102 is a relay lens, 103 is a connecting tube, 104 denotes a straight tube, 105 denotes an eyepiece, 106 denotes a binocular tube, 107 denotes a lens mount, 108 denotes a light source for fluorescence excitation, 109 denotes an incident-light fluorescence equipment, 110 denotes an arm, 111 denotes a revolver, 112 denotes an objective lens, 113 denotes a stage, 114 denotes a vertical adjustment mechanism, 115 denotes a condenser, 116 denotes a main stand, and 117 denotes a base and illumination system.

A conventional optical microscope as shown in FIG. 1 comprises a base and a illumination system at the bottom, with one end installed on the main stand. An arm is supported on the side of the upper end of the main stand, basically forming a U-shaped structure. The main stand supports the vertical adjustment mechanism for the sample mounting stage. A condenser is set under the stage to guide illumination light from the illumination system to the sample being observed. The objective lens with a revolver to choose the lens magnification is mounted under the arm. The incident-light fluorescence equipment, lens mount, straight tube, relay lens, and TV camera are installed above the arm. The light source for fluorescence excitation is attached to the side of the incident-light fluorescence device. The binocular tube and eyepiece are mounted on the side of the lens mount. In addition, the accessory measuring units, cameras, and other devices are mounted like "branches and leaves" on a tree. The important components of an optical photometric system and optical imaging system, corresponding to the trunk of the tree, are unstable because the main stand is set on one end of the base and the illumination system. This cantilever structure makes not only the "branches and leaves" but also the thin "trunks" to sway like a willow tree.

In the conventional optical microscope, a half-mirror (including dichroic mirror) is typically installed on the inlet of the illumination system (incident-light fluorescence, total internal reflection fluorescence, transmitted light fluorescence, incident polarized light, transmitted polarized light, bright field incidence, optical tweezers, and etc.) and also on the inlet of the optical monitor system. A single imaging lens is, however, commonly used to reduce cost. The support fixtures for the illumination system are integrated with the optical imaging and photometric systems, with the result that instability caused by asymmetry in the shape and mass of the support fixtures for the illumination and monitor systems and shrinkage/elongation of those support fixtures due to temperature dependency bring about the fluctuation of the optical axis in the optical imaging and photometric systems.

A new field of study called single-molecule physiology is becoming popular. In this science, the motion of protein and other biological molecules is observed and controlled. Optical microscopes are essential tools in this study and they require accuracy of several nanometers for effective analysis because the motions of the biological substances are minute.

Currently available optical microscopes are not stable enough and drift occurs during observation, recording and measurement performed for extended times. The observation results are always subject to errors.

The present invention offers a highly stable optical microscope that is free from defocusing of samples and displacement (drift) of the object point (object) during observation. A dedicated, rather than common, imaging lens is mounted for each optical system headed by an imaging lens.

By installing a dedicated imaging lens for each system, for example the television camera system, the center of the imaging lens and focal position are displaced together. This principle is described below referring to FIGS. 2A and 2B.

Assume displacement in the X-Y direction occurs as shown in FIG. 2B relative to the ideal position shown in FIG. 2A due to the effects of instability caused by asymmetry in the shape and mass of the support fixtures. Since the imaging lens and television camera are integrated, the object is successfully imaged without relative displacement of the center of the imaging lens and the focal position, although light flux is somewhat deviated.

This is an application of the principle of astronomical telescopes. There is no displacement, parallel or perpendicular to the optical axis, of the image of the object relative to the imaging lens, provided that the telescope only translates without inclination.

DISCLOSURE OF THE INVENTION

The technical means adopted by this invention is a structure of a highly stable optical microscope in which the objective lens, imaging lens, optical imaging system and optical photometric system are mounted without deviation, and while forming a straight line, on the straight guide mechanism and support structures that are symmetrical about the optical axis in both shape and mass.

Another technical means adopted by this invention is a structure of a highly stable optical microscope in which the support structure for the optical imaging system and photometric system are either a square truncated pyramid or circular truncated cone, to prevent changes in inclination caused by temperature fluctuations, vibration or other factors.

Another technical means adopted by this invention is a structure of a highly stable optical microscope in which, in an infinity corrected optical microscope, a half mirror (including dichroic mirror) and an imaging lens are combined and mounted at, the inlet of the optical lighting system (incident-light fluorescence, total internal reflection fluorescence, transmitted light fluorescence, incident polarized light, transmitted polarized light, bright field incidence, optical tweezers and etc.) and also the optical monitor system, respectively, to make the optical imaging and photometric systems stable and free from the asymmetry of shape and mass and instability caused by temperature dependency of the metal support structures by utilizing the principle of a telescope.

Another technical means adopted by this invention is a structure of a highly stable optical microscope in which the sample base, symmetrically built in shape and mass about the optical axis, and the objective lens (sample section) are integrated and supported by the support structure that is independent of all imaging lenses, and integrated into the system at a low center of gravity.

BRIEF DESCRIPTION OF THE DRAWINGS

FIG. 2A shows the ideal position (movement-free).

FIG. 2B shows that the entire optical imaging system has moved in the X-Y direction.

DETAILED DESCRIPTION OF THE PREFERRED EMBODIMENTS

Figure 1:
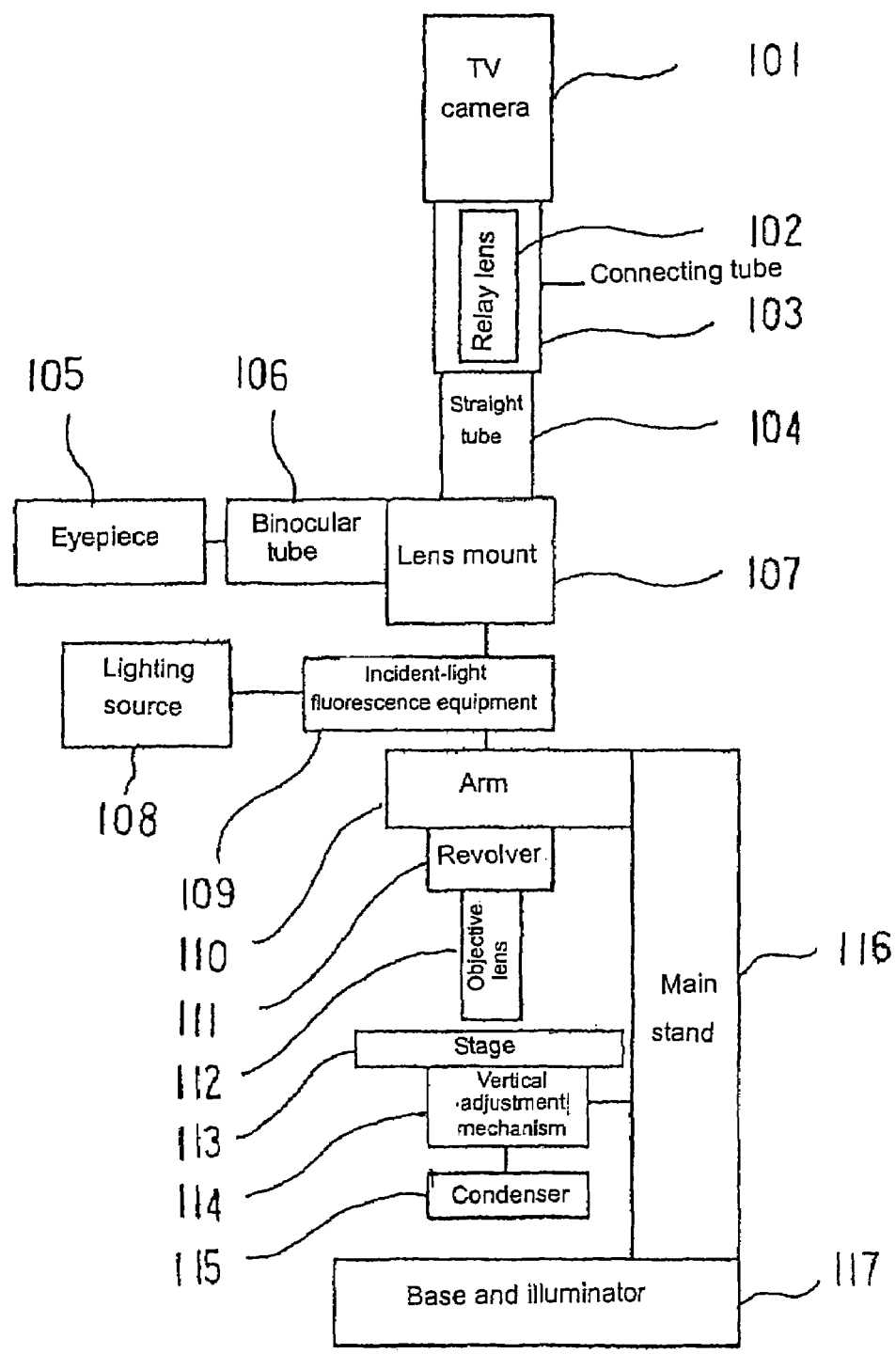
FIG. 1 shows a typical conventional optical microscope.
Figure 2A:
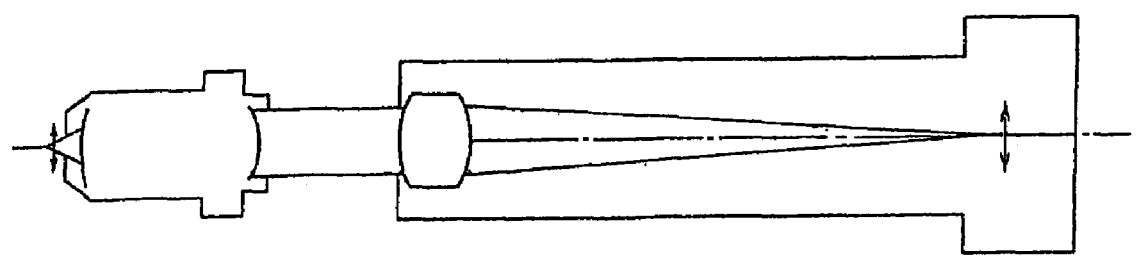
FIGS. 2A and 2B show the principle that the center of an imaging lens and the focal position are displaced by integrating the imaging lens with, for example, a TV camera.
Figure 2B:
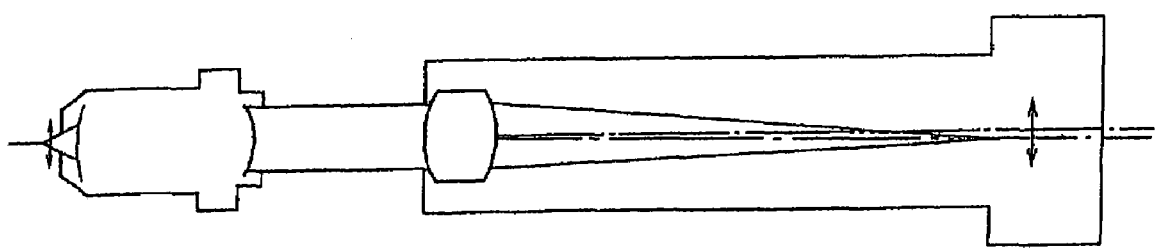
Figure 3:
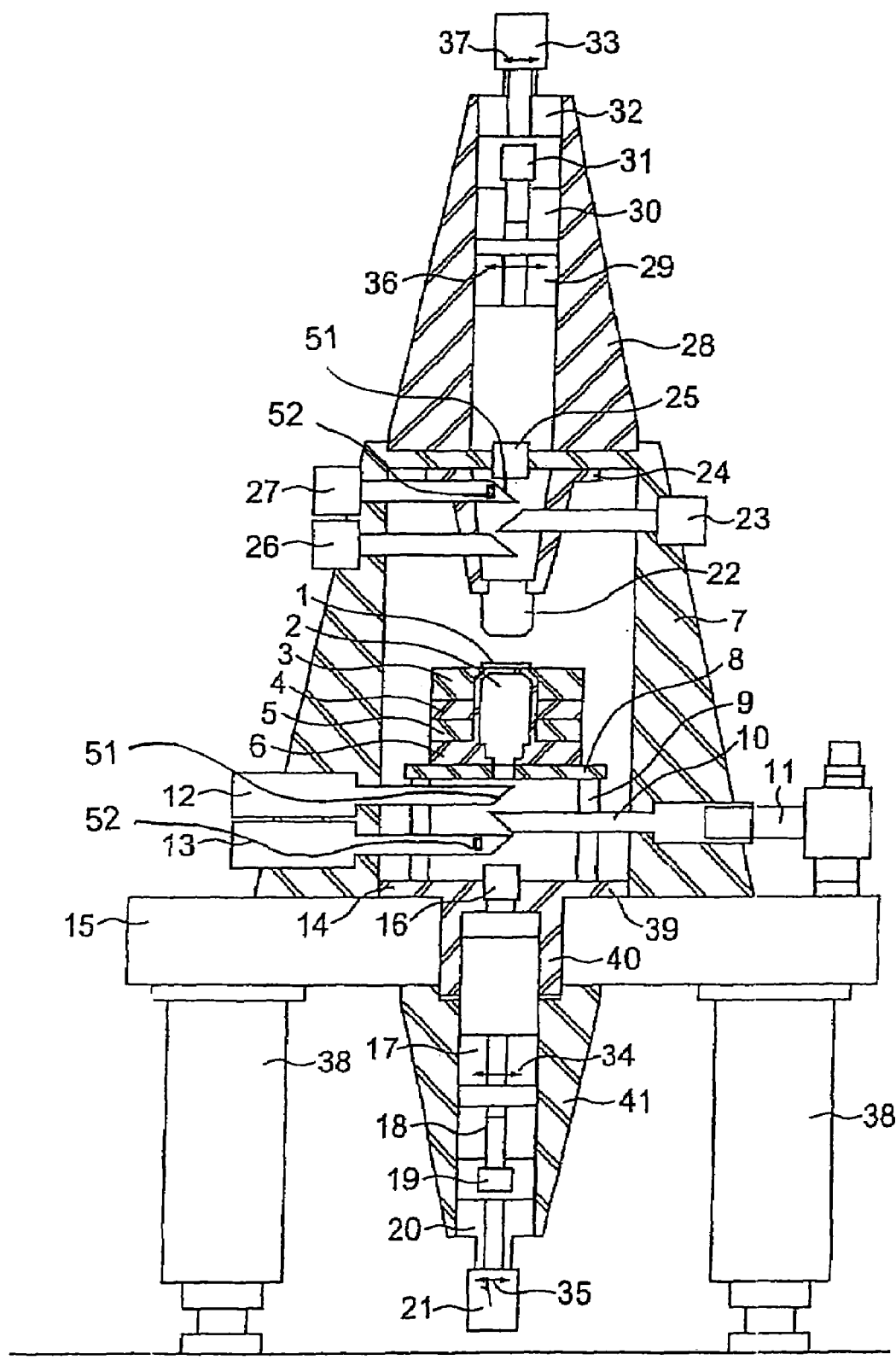
FIG. 3 shows an optical microscope structured as this invention.

The highly stable optical microscope of this invention is described below referring to FIG. 3.

The infinity corrected optical microscope comprises an optical imaging system (consisting of photometric iris 17, relay lens support fixture 18, relay lens 19, television camera support fixture 20, and television camera 21), an optical photometric system (consisting of straight tube 28, photometric iris 29, relay lens fixture 30, relay lens 31, photometric system support fixture 32, and photometric system 33), an illumination system (consisting of incident-light fluorescence 12, total-internal- reflection-fluorescence, transmitted light fluorescence, incident polarized light, transmitted polarized light, bright field incidence, optical tweezers 10 and 11, and etc.), and the infinity corrected objective lens 2 and imaging lens 16 built into the optical lighting system. A hollow conical support base 7 is fixed on the vibration isolating table 15, which is supported by support legs 38. The optical tweezers port 10, incident-light fluorescence equipment 12, and a first optical monitor system 13 are installed on the expanded section below said support base 7, facing toward the center.

The optical tweezers illumination system 11, mounted on the vibration isolating table 15, is connected to the optical tweezers port 10. The base 14, with imaging lens 16 at the center, is installed at the lower part of the hollow section of said support base 7. The flat part 39 of said base 14 rests on the vibration isolating table 15 while its leg 40 is inserted into the center of the vibration isolating table 7. Support stands 9 are set on said base 14, supporting a substrate 8 at the top. A mounting base 6, Y-axis coarse transfer base 5, X-axis coarse transfer base 4, and X-, Y-, Z-axis finely adjustable sample base 3 are installed on said substrate in this order. The sample 1 to be observed is placed on said X-, Y-, Z-axis finely adjustable sample base, and is illuminated by said lighting system.

The transmitted light illumination system 23, dark field illuminator 26, and a second optical monitor system 27 are mounted on the narrower section at the upper part of the support base 7, facing toward the center. The condenser lens 22 is mounted on the tip of the condenser lens support fixture 24, which is fixed on the support base 7. The imaging lens 25 for the lighting system is mounted on the flat part of the tip of the support base 7 at the center.

The hollow and trapezoidal straight tube 28, fixed on the flat part at the tip of said support base 7, holds as installed, the photometric iris 29, relay lens support fixture 30, relay lens 31, photometric system support fixture 32, and photometric system 33 in this order, generating the primary 36 and the secondary 37 image on the photometric side.

A hollow and inverted trapezoidal support structure 41 mounted on the bottom face of the vibration isolating table 15. The hollow section of the support structure 41 accommodates, as installed, the photometric iris 17, relay lens support fixture 18, relay lens 19, television camera support fixture 20, and television camera 21 in this order, generating the primary 34 and the secondary 35 image on the imaging side.

As described above, the highly stable optical microscope of this invention features a construction in which the infinity corrected objective lens 2, imaging lens 16, imaging lens 25 for the lighting system, optical imaging system (consisting of the photometric iris 17, relay lens support fixture 18, relay lens 19, television camera support fixture 20, and television camera 21), and the optical photometric system (consisting of the straight tube 28, photometric iris 29, relay lens fixture 30, relay lens fixture 31, photometric system support fixture 32, and photometric system 33) are mounted without deviation, while forming a straight line, on the straight guide mechanism that is symmetrical about the optical axis in both shape and mass.

The infinity corrected system is integrated into the mechanism of this invention, and the optical imaging and photometric systems each have an integrated imaging lens. This allows utilization of the merit of a telescope in that translation does not lead to defocusing or movement (drift) of the object point (object) during observation for extended times as long as inclination does not change. A typical example of this straight guide mechanism comprises a cylinder and a column. The cylindrical section is movable in the direction of the optical axis.

The sample is focused on the sample base 3 which features finely adjustable X, Y, and Z axes. The adjustable sample base 3 is symmetrical about the optical axis and incorporates a capacitance type sensor to feed back displacement to the piezo drive mechanism to maintain the focal position.

A half mirror 51 (including dichroic mirror) and an imaging lens 52 are set on the inlet of the optical lighting system (incident-light fluorescence 12 total internal reflection fluorescence, transmitted light fluorescence, incident polarized light transmitted polarized light, bright field incidence, optical tweezers port, 10 and 11, etc.). The illumination system is supported by a separate support fixture independent of the optical imaging and photometric systems to assure that instability due to asymmetry of the shape and mass will not affect the optical imaging and photometric systems.

Even if the optical imaging, photometric or illumination systems should move, the above principle of a telescope works and, moreover, a change in inclination is prevented by mounting on the solid trapezoidal (pyramid-type) support base 7. Heavy and large-sized components such as an optical tweezers illumination system are further separated and directly mounted on the vibration isolating table 15, preventing unstable factors such as overlapped imbalance and inclination.

Therefore, if the illumination system should be displaced due to external vibration or other causes, the sample and the objective lens are not affected by the displacement.

The single most important factor of instability is the relative motion of the sample and objective lens.

For this reason, the sample 1, infinity corrected objective lens 2, X-, Y-, Z-axes finely adjustable sample base 3, X-axis coarse transfer base 4, Y-axis coarse transfer base 5, and mounting base 6 are respectively fixed and integrated such as by vacuum suction.

This integration to eliminate the relative motion of sample and objective lens is very effective for maintaining stability. These parts are furthermore directly mounted on the vibration isolating table 15 and arranged at a low center of gravity to make the solution more effective.

(The conventional system, like a willow tree with thin trunks swaying in the wind, is replaced by a separately structured system comprising a construction like Tokyo Tower with a building directly below the Tower. The integrated sample and objective lens correspond to the building and are located with a low center of gravity.)

This invention may be implemented in various other forms of embodiment without deviating from the spirit of the main features. The above-mentioned embodiments are therefore only a few examples and should not be construed as limiting.

INDUSTRIAL APPLICABILITY

The highly stable optical microscope of this invention features an objective lens, imaging lens, optical imaging and photometric systems that are mounted without deviation, while forming a straight line, on the straight guide mechanism and support structures that are symmetrical about the optical axis in both shape and mass as described above. The highly stable optical microscope of this invention makes it possible to measure the position of molecules and molecular movement in the order of nanometers in molecular biology and biophysics. It is also possible to record images for an extended time without drift In the infinity corrected optical microscope, a half mirror (including dichroic mirror) and an imaging lens are combined and mounted at the inlet of the illumination system (incident-light fluorescence, total internal reflection fluorescence, transmitted light fluorescence, incident polarized light, transmitted polarized light, bright field incidence, optical tweezers and etc.) and the optical monitor system. This provides freedom for the mounting positions and compatibility of the respective components, enabling an optical microscope system that is expandable and highly stable.

What is claimed is:

1. A highly stable optical microscope,
    wherein an objective lens, an imaging lens, an optical imaging and a photometric system are mounted without deviation, forming one single straight line, on a straight guide mechanism and a hollow support structure, surrounding the straight guide mechanism, that are symmetrical about an optical axis in both shape and mass; and
    the support structure for the optical imaging and photometric system is a square truncated pyramid or a circular truncated cone to prevent changes in inclination due to temperature fluctuations and vibration.

2. The highly stable optical microscope as claimed in claim 1,
    wherein a sample base and the objective lens, arranged symmetrically in shape and mass about the optical axis, are integrated and supported by support structures that are independent of all imaging lenses and are integrated at a low center of gravity close to a vibration isolating table.

3. The highly stable optical microscope as claimed in claim 1,
    wherein in an infinity corrected optical microscope, a half mirror and the imaging lens are combined and mounted at the inlet of an optical illumination system and an optical monitor system respectively, and
    wherein the optical illumination system is a combination of at least an incident-light fluorescence, a total internal reflection fluorescence, a transmitted light fluorescence, an incident polarized light, a transmitted polarized light, a bright field incidence, and an optical tweezer.

4. The highly stable optical microscope as claimed in claim 3,
    wherein a sample base and the objective lens, arranged symmetrically in shape and mass about the optical axis, are integrated and supported by support structure that is independent of all imaging lenses and is integrated at a low center of gravity close to a vibration isolating table.

5. The highly stable optical microscope as claimed in claim 3,
    wherein the half mirror is a dichroic mirror.

6. A highly stable optical microscope,
    wherein an objective lens, an imaging lens, an optical imaging and a photometric system are mounted without deviation, while forming a straight line, on a straight guide mechanism and a hollow support structure that are symmetrical about an optical axis in both shape and mass,
    wherein a sample base and the objective lens, arranged symmetrically in shape and mass about the optical axis, are integrated and supported by support structures that are independent of all imaging lenses and are integrated at a low center of gravity close to a vibration isolating table;
    wherein a half mirror and the imaging lens are combined and mounted at the inlet of an optical illumination system and an optical monitor system respectively, the half mirror being dichroic mirror; and
    wherein the optical illumination system is a combination of at least an incident-light fluorescence, a total internal reflection fluorescence, a transmitted light fluorescence, an incident polarized light, a transmitted polarized light, a bright field incidence, and an optical tweezer.

* * * * *